United States Patent
Rueger

(10) Patent No.: US 6,849,988 B2
(45) Date of Patent: Feb. 1, 2005

(54) METHOD AND DEVICE FOR CHARGING AND DISCHARGING A PIEZOELECTRIC ELEMENT

(75) Inventor: Johannes-Joerg Rueger, Vienna (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/293,536

(22) Filed: Nov. 12, 2002

(65) Prior Publication Data

US 2004/0130240 A1 Jul. 8, 2004

(30) Foreign Application Priority Data

Nov. 10, 2001 (DE) .......................................... 101 55 390

(51) Int. Cl.[7] .............................................. H01L 41/09
(52) U.S. Cl. ................................................ 310/316.03
(58) Field of Search ................................ 310/316.03, 317, 310/319; 123/319

(56) References Cited

U.S. PATENT DOCUMENTS

| | | | | |
|---|---|---|---|---|
| 3,589,345 A | * | 6/1971 | Benson ....................... | 123/478 |
| 5,130,598 A | * | 7/1992 | Verheyen et al. ....... | 310/316.03 |
| 5,869,918 A | | 2/1999 | Ashizawa .................. | 310/325 |
| 6,081,061 A | * | 6/2000 | Reineke et al. ......... | 310/316.03 |
| 6,366,868 B2 | * | 4/2002 | Freudenberg et al. ....... | 702/115 |
| 6,384,512 B1 | * | 5/2002 | Maeda ................... | 310/316.03 |
| 6,539,925 B2 | * | 4/2003 | Rueger et al. .............. | 123/490 |
| 6,619,268 B2 | * | 9/2003 | Rueger et al. .............. | 123/490 |
| 6,733,102 B2 | * | 5/2004 | Hosono ...................... | 347/14 |
| 6,784,596 B2 | * | 8/2004 | Rueger et al. ......... | 310/316.03 |
| 2001/0035697 A1 | * | 11/2001 | Rueger et al. ......... | 310/316.03 |
| 2001/0038398 A1 | * | 11/2001 | Kitahara ...................... | 347/19 |
| 2002/0057303 A1 | * | 5/2002 | Takahashi et al. ............. | 347/9 |
| 2002/0145637 A1 | * | 10/2002 | Umeda et al. ................. | 347/9 |

FOREIGN PATENT DOCUMENTS

| | | | | |
|---|---|---|---|---|
| DE | 198 54 789 | | 8/1999 | ............ H02N/2/06 |
| DE | 199 21 456 | | 11/2000 | ........... F02D/41/30 |
| JP | 1-264575 | * | 10/1989 | ................. 310/314 |

* cited by examiner

*Primary Examiner*—Thomas M. Dougherty
(74) *Attorney, Agent, or Firm*—Kenyon & Kenyon

(57) ABSTRACT

A method and a device for transmitting an elastic deflection of a piezoelectric element to an actuator by using a direct voltage source, generated from a supply voltage, for charging or discharging the piezoelectric element. An actuating motion of the actuator is modified as a function of the control voltage of the piezoelectric element, the voltage gradient being simultaneously adjusted to the control voltage.

22 Claims, 4 Drawing Sheets

METHOD AND DEVICE FOR CHARGING AND DISCHARGING A PIEZOELECTRIC ELEMENT

FIELD OF THE INVENTION

The present invention relates to a method and a device for charging and discharging a piezoelectric element where electric charge carriers are transported back and forth between a direct voltage source and the piezoelectric element in order to transmit an elastic deflection of the piezoelectric element to an actuator.

BACKGROUND INFORMATION

Conventionally, piezoelectric elements have the characteristic of contracting or expanding as a function of a direct voltage applied to them or of a direct voltage established across them. The practical implementation of actuators using piezoelectric elements may be suitable when the actuator has to perform quick and/or frequent movements. Among other things, the piezoelectric element may be used as an actuator in fuel injectors for internal combustion engines. For certain applications it may be necessary that different degrees of expansion or, if needed, varying degrees of expansion be induceable in the piezoelectric element as precisely as possible; for example, when the piezoelectric element is used as an actuator in a fuel injection system. Through direct or indirect transmission to a control valve, different degrees of expansion of the piezoelectric element correspond to the displacement of an actuator, for example, a nozzle needle. The displacement of the nozzle needle results in the opening of injection orifices. The duration of the opening of the injection orifices corresponds to a desired injected quantity as a function of a free cross section of the orifices and an applied pressure. The control valve which controls the movement of the nozzle needle need not be triggered directly, but may be triggered via a hydraulic coupler starting at the piezoelectric element.

The piezoelectric element, together with the hydraulic coupler, the adjoining control valve and the nozzle needle, forms a complex spring-mass system. No excessive oscillations are to be induced in the spring-mass system by the triggering, because this would affect the desired injected quantity. Excitation of oscillations of the piezoelectric element may thus not be arbitrarily short.

Assuming a predefined voltage level, there is a lower time threshold at which a trigger duration, composed of a charging operation and a holding operation, may not be shortened any further without causing oscillations of the spring-mass system.

A conventional operating mode using a specific trigger cycle may make a non-oscillating deflection of piezoelectric elements possible via the modification of the trigger duration; however, the lower time threshold as a limit remains. In the case of a technical requirement for arbitrarily small injected quantities under an extremely high rail pressure in fuel injection systems, non-oscillating triggering is no longer possible using the conventional methods.

SUMMARY

According to an example method according to the present invention, the level of an actuating motion of the actuator may be modified by charging the piezoelectric actuator to a variable voltage. The charging and discharging periods of the actuator remain unchanged in order to safely prevent the above-mentioned oscillations, even when the control voltage varies. This new second operating mode may be used for implementing minute quantities, for example, in fuel injection systems having a high rail pressure, since minute actuating motions of the actuator may be performed in a simple manner without causing oscillations of the spring-mass system.

According to the present invention, a control unit may be provided which selects, prior to the start of the control cycle, whether triggering takes place in the first operating mode or in the second operating mode. All data necessary for a suitable selection between the operating modes may be detected and parameterized in the control unit according to the present invention.

DETAILED DESCRIPTION

Figure 1:
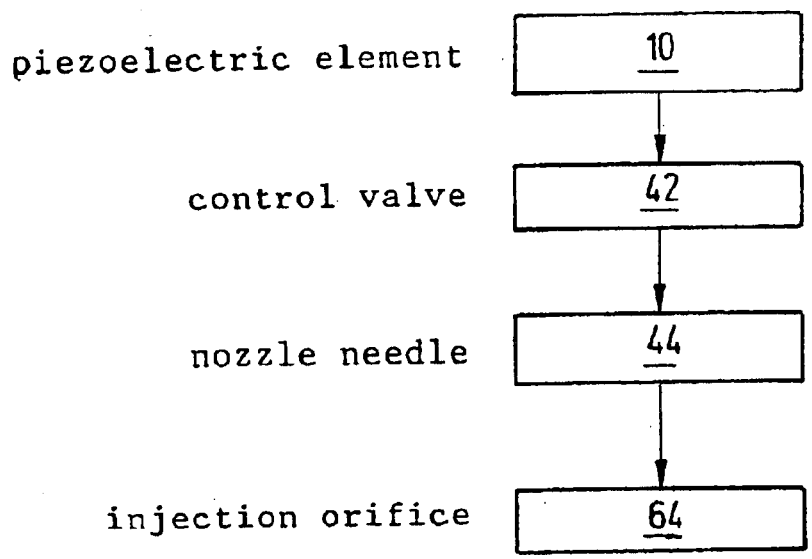
FIG. 1 shows a schematic illustration of an example embodiment of a fuel injection system having a direct triggering of an actuator.
Figure 2:
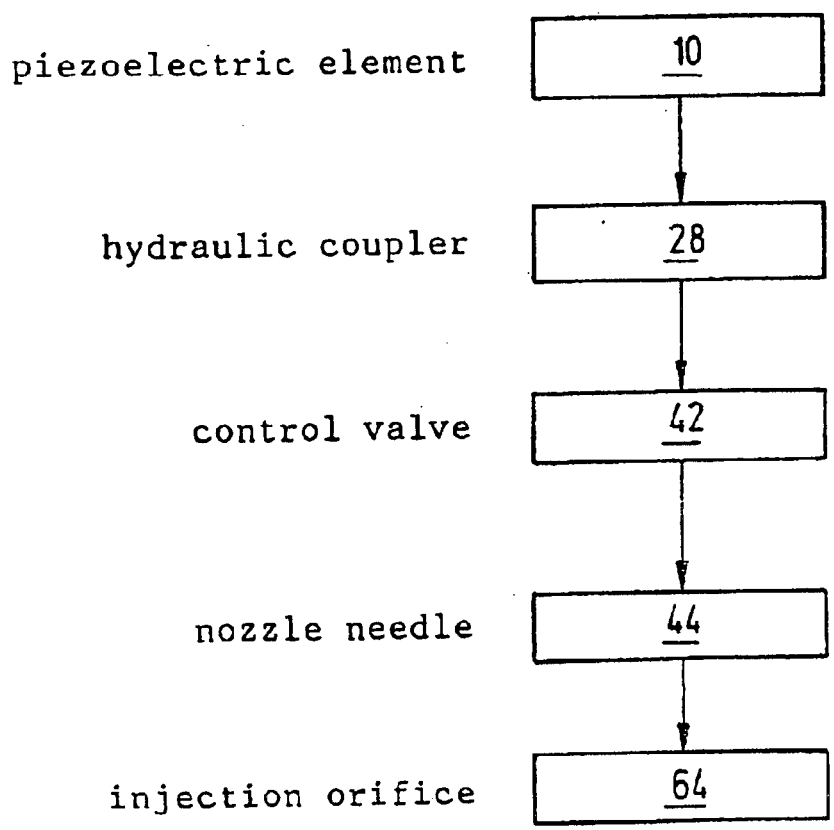
FIG. 2 shows a schematic illustration of an example embodiment of a fuel injection system having an indirect triggering of the actuator.

Control valve 42, which moves an actuator 14, is used for transmission of a deflection of a piezoelectric element 10 to actuator 14. This direct transmission mode is depicted in FIG. 1. The transmission mode according to the present invention is depicted in FIG. 2 and is explained in detail in the following. For the transmission of the deflection of piezoelectric element 10 to control valve 42, a hydraulic coupler 28 is interposed. Subsequently, the actuating motion of hydraulic coupler 28 is transmitted to actuator 14 via control valve 42. A nozzle needle 44, which opens injection orifices 64 for a predetermined time period, is moved by the deflection of actuator 14 in both transmission modes.

Figure 3:
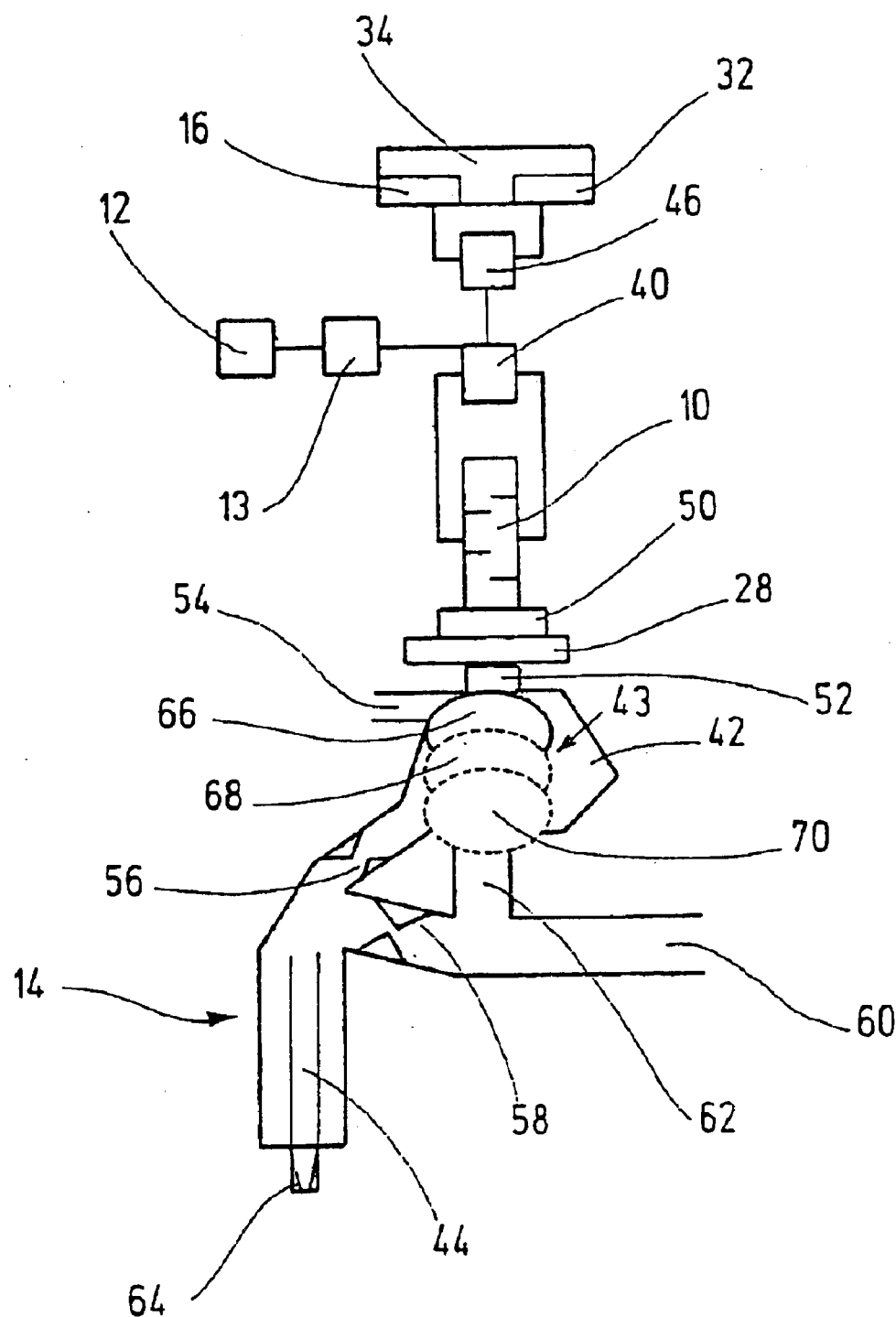
FIG. 3 shows a schematic illustration of an example embodiment of a fuel injection system.

FIG. 3 shows a schematic illustration of a fuel injection system. A supply voltage 12 feeds a direct voltage source 13 which in turn supplies a charging and discharging unit 40. Data from fuel injection systems, which is used for triggering a trigger module 46, may be parameterized for controlling and regulating in a microcontroller 34 of a control unit. A first operating mode 16 and a second operating mode 32, which are explained in detail later, are formed for triggering trigger module 46. In both operating modes 16 and 32, charging and discharging unit 40 may be activated via trigger module 46. Electric charge carriers of direct voltage source 13 are transmitted to and from piezoelectric element 10. The transmission takes place within a control cycle 20 (FIGS. 4 and 5) which may be formed by a charging operation 22, a holding operation 24, and a discharging operation 26. In both operating modes 16 and 32, charging operation 22 and discharging operation 32 may be implemented in an identical time period. During charging operation 22, and generally during holding operation 24, piezoelectric element 10 is mechanically deflected. The deflection is transmitted to hydraulic coupler 28 via a piston 50. Then the transmission takes place from hydraulic coupler 28 to piston 52 and subsequently to control valve 42. Different responses of control valve 42 and consequently of actuator 14, or of nozzle needle 44, take place as a function of selected operating mode 16 or 32.

The following explanation of the example embodiment is based on a constant rail pressure of a rail chamber 60. The explanation is also based on piezoelectric element 10, piston 50, hydraulic coupler 28, and piston 52, which together with the moving discrete masses inside the control valve up to nozzle needle 44 form the complex spring-mass system.

As described above, both operating modes 16 and 32 operate according to control cycle 20 on which the following description of operating modes 16 and 32 is based.

As shown in FIG. 3, a valve element 43 rests in a first seat 66 and seals a return line 54 in second operating mode 16 before the triggering of piezoelectric element 10. Due to the pressure of rail chamber 60, nozzle needle 44 is kept in its closed state.

Figure 4:
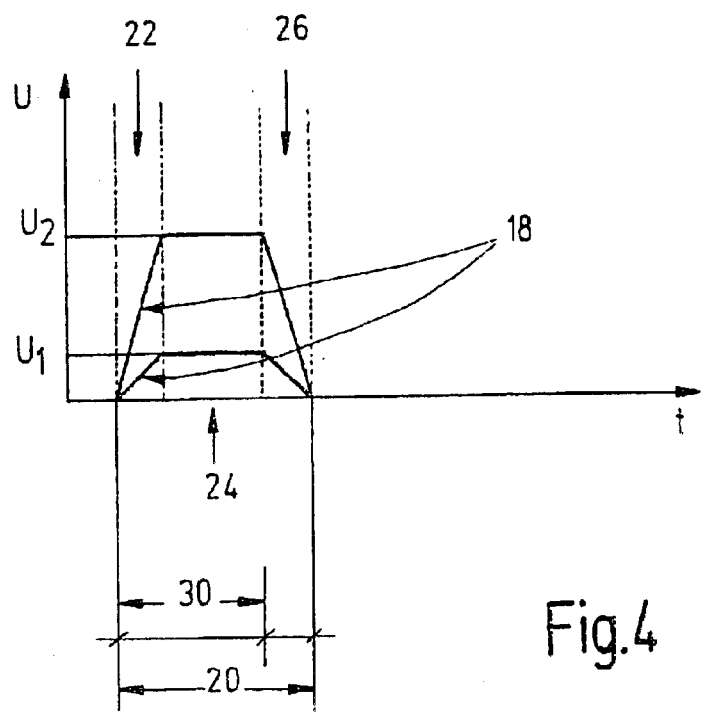
FIG. 4 shows a diagram illustrating the control cycle in the limit range of a lower time threshold with the formation of a voltage level $U_1$ and unchanged charging and discharging periods (second operating mode).

As shown in FIG. 4, charging operation 22 of piezoelectric element 10 takes place via a variable voltage gradient 18 until a voltage level $U_1$ is reached. Holding operation 24 follows on the same voltage level $U_1$.

Charging operation 22 and holding operation 24 are implemented observing a lower time threshold 30. Lower time threshold 30 is the sum of the time periods of charging operation 22 and holding operation 24, during which the spring-mass system has just not yet started to oscillate.

As shown in FIG. 3, starting from the deflection of piezoelectric element 10, hydraulic coupler 28 is mechanically deflected via piston 50 and piston 52.

After being deflected from first seat 66 by piston 52 inside control valve 42, valve element 43 is displaced into a middle position 68 between seat 66 and seat 70 without sealing rail bypass 62. Return line 54 is simultaneously opened. Depressurization via return line 54 takes place via an intake throttle 58, a discharge throttle 56, and rail bypass 62. Intake throttle 58 has a smaller cross section than discharge throttle 56. The rail pressure of rail chamber 60 acts on the back of discharge throttle 56 via opened rail bypass 62 and on the front of discharge throttle 56 via intake throttle 58. The pressure in the area of nozzle needle 44 drops only to the point where nozzle needle 44 opens in a partial lift or at least opens more slowly than it would at a lower pressure, and injection orifices 64 are opened.

The spring-mass system does not oscillate since, for implementation of a partial lift, voltage gradient 18 has been changed within charging operation 22 of control cycle 20 observing lower time threshold 30.

As shown in FIG. 4, voltage level $U_1$ drops back during discharging operation 26 and the deflection of piezoelectric element 10 goes back to zero.

As shown in FIG. 3, hydraulic coupler 28 and pistons 52 and 50 yield to the rail pressure of rail chamber 60 via rail bypass 62 following valve element 43. Valve element 43 seals return line 54 and is replaced into first seat 66. Nozzle needle 44 is simultaneously closed again by the restored rail pressure of rail chamber 60 inside of control valve 42.

As shown in FIG. 3, a valve element 43 rests in the first seat and seals return line 54 in first operating mode 32, conventionally, before the triggering of piezoelectric element 10. Due to the pressure of rail chamber 60, nozzle needle 44 is kept in its closed state.

Figure 5:
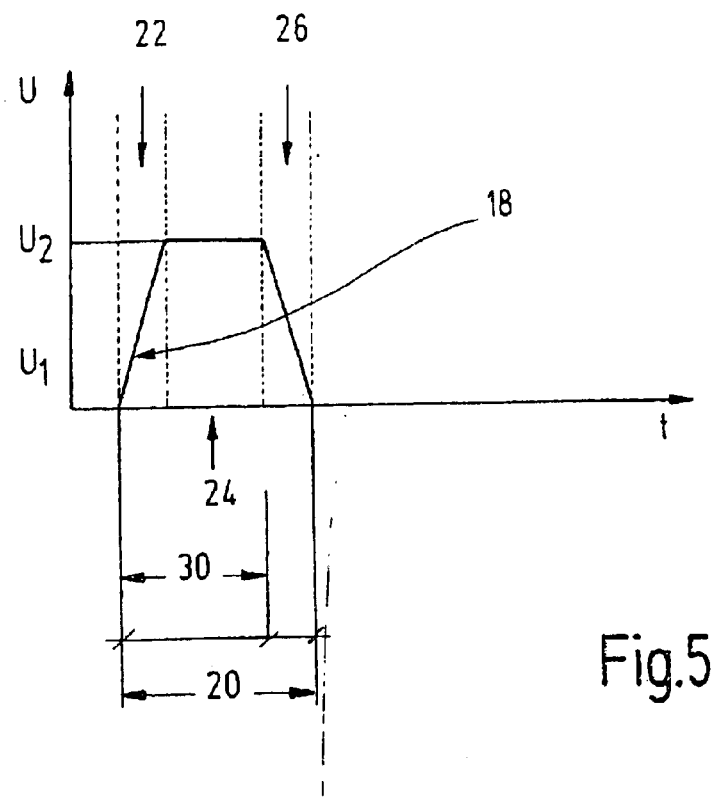
FIG. 5 shows a diagram illustrating a control cycle in areas greater than or equal to the lower time threshold at a predefined constant direct voltage level $U_1$ (first operating mode).

As shown in FIG. 5, charging operation 22 of piezoelectric element 10 takes place until predetermined voltage level $U_2$ is reached. Holding operation 24 follows on the same voltage level $U_2$.

Charging operation 22 and holding operation 24 are implemented observing lower time threshold 30.

As shown in FIG. 3, hydraulic coupler 28 is mechanically deflected, due to the deflection of piezoelectric element 10, via piston 50 and piston 52.

After deflection from first seat 66 via piston 52 inside of control valve 42, valve element 43 is displaced into second seat 70 so that rail bypass 62 is sealed. Return line 54 is simultaneously opened. Depressurization via return line 54 takes place via intake throttle 58 and discharge throttle 56. Intake throttle 58 having a smaller cross section than discharge throttle 56 creates a pressure drop on nozzle needle 44 in a time period that is predefinable via the throttle cross sections. Since in this operating mode 32 the rail pressure of the rail chamber does not act upon the back of discharge throttle 56 via opened rail bypass 62, the pressure on nozzle needle 44 drops to the point that nozzle needle 44 opens in a full lift and injection orifices 64 are opened completely.

The spring-mass system does not oscillate, because in order to implement the full lift, according to FIG. 5, charging operation 22 and holding operation 24 within control cycle 20 has been performed on a predetermined voltage level $U_2$ observing lower time threshold 30. Subsequently, voltage level $U_2$ drops back during discharging operation 26 and the deflection of piezoelectric element 10 moves back to zero.

As shown in FIG. 3, hydraulic coupler 28 and pistons 52 and 50 yield to the rail pressure of rail chamber 60 following valve element 43 via rail bypass 62. Valve element 43 leaves second seat 70 and seals return line 54, being re-placed into first seat 66. Nozzle needle 44 is simultaneously closed again by the restored rail pressure of rail chamber 60 inside of control valve 42.

Figure 6:
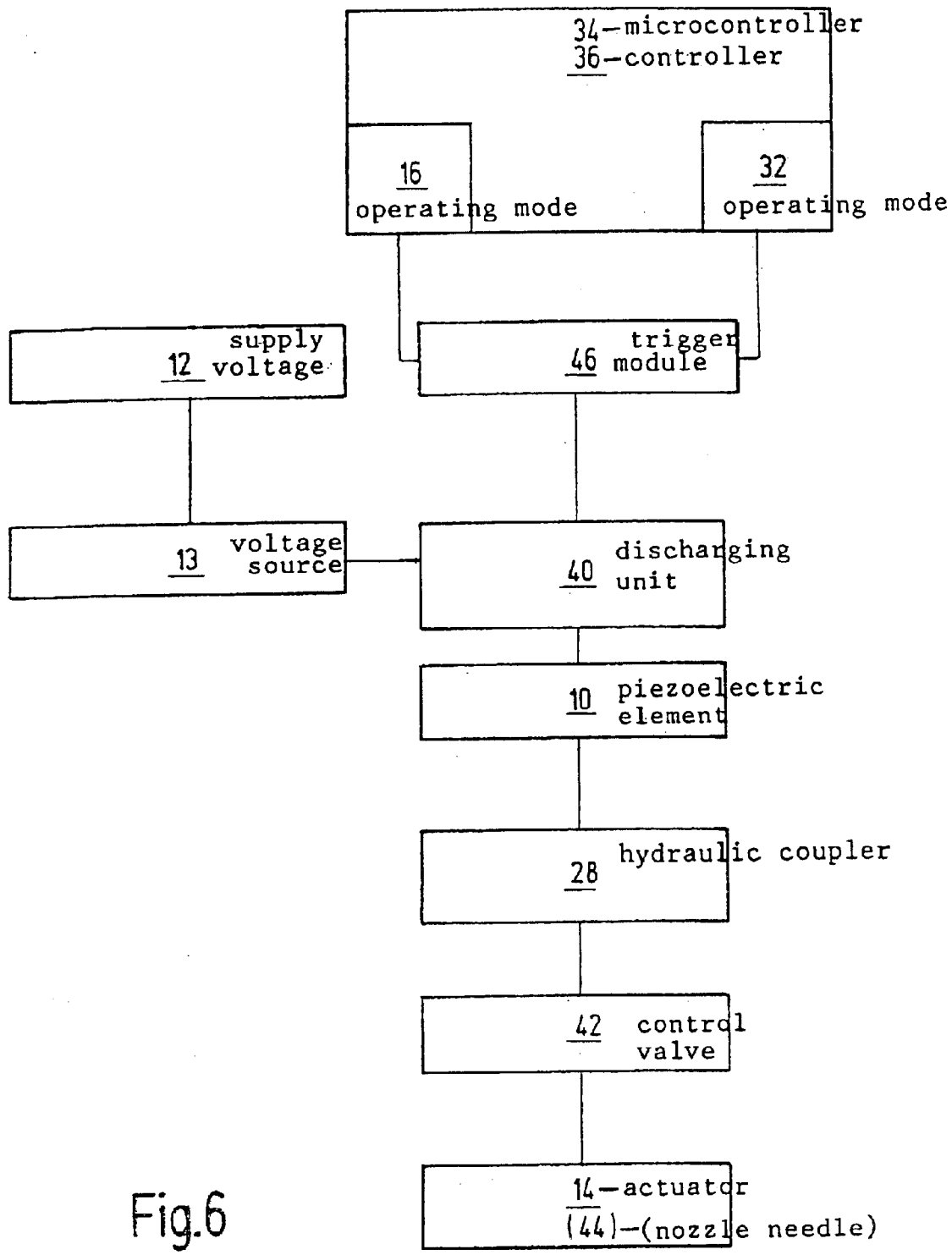
FIG. 6 shows a schematic illustration of an example embodiment of a device according to the present invention in a block diagram format.

The device for charging and discharging a piezoelectric element 10, shown in FIG. 6 and described in detail in the following, has charging and discharging unit 40. Direct voltage source 13, situated between supply voltage 12 and charging and discharging unit 40, is assigned to charging and discharging unit 40. Direct voltage source 13 together with charging and discharging unit 40 and microcontroller 34 are parts of the control unit.

A piezoelectric element 10, connected to a hydraulic coupler 28, is assigned to charging and discharging unit 40 in a conventional manner. Piston 50 on the input side of hydraulic coupler 28 and piston 52 on the output side of hydraulic coupler 28 are situated between hydraulic coupler 28 and piezoelectric element 10 (FIG. 3). Control valve 42 is assigned to piston 52 on the output side of hydraulic coupler 28. Control valve 42 has an actuator 14, which may be, for example, a nozzle valve 44. The device also includes microcontroller 34 and trigger module 46 and is directly assigned to charging and discharging unit 40. Microcontroller 34 has a controller 36 with which, in the second operating mode, an actuating motion of actuator 14 is modifiable by variation of the control voltage applied, the voltage gradient also being changed simultaneously. Within controller 36, microcontroller 34 has the first operating mode, using which an actuating motion of actuator 14 may be determined as a function of a holding operation 24 over time. Operating modes 16 and 32 in microcontroller 34 may be selected as a function of the recorded and parameterized data of microcontroller 34. This makes it possible to determine which operating mode 16 or 32 is subsequently assigned to trigger module 46. In accordance with microcontroller 34 and controller 36, the sequence of operating modes 16 or 32 may be combined freely and are transmittable to charging and discharging unit 40 via trigger module 46.

What is claim is:

1. A method of charging or discharging a piezoelectric element, comprising:
   transporting electric charge carriers back and forth between a direct voltage source and the piezoelectric element to transmit an elastic deflection of the piezoelectric element to an actuator; and
   modifying an actuating motion of the actuator as a function of a level of voltage applied to the piezoelectric element and simultaneously adapting a voltage gradient to the voltage applied, wherein the adaptation of the voltage gradient occurs within at least one of a charge operation and a discharge operation, and wherein a duration of the charge operation and a duration of the discharge operation remain constant independent of the adaptation of the voltage gradient.

2. The method according to claim 1, further comprising:
   forming a control cycle by a charge operation, a subsequent holding operation, and a discharging operation of the piezoelectric element.

3. The method according to claim 1, wherein a charging operation and a discharging operation of the piezoelectric element are independent of the level of the voltage of the piezoelectric element.

4. The method according to claim 3, wherein the charging operation and discharging operation have a same duration.

5. The method according to claim 2, further comprising:
   directly transmitting the elastic deflection of the piezoelectric element resulting from the control cycle to the actuator.

6. The method according to claim 2, further comprising:
   transmitting the elastic deflection of the piezoelectric element resulting from the control cycle to the actuator indirectly via a hydraulic coupler.

7. The method according to claim 2, further comprising:
   transmitting the deflection of the piezoelectric element to the actuator as a function of an applied direct voltage of the holding operation modified over time, the transmitting starting in a second operating mode at or above a lower time threshold for the control cycle.

8. The method according to claim 7, further comprising:
   transmitting, in a first operating mode, an actuating motion to the actuator that is smaller than a smallest actuating motion within the second operating mode.

9. The method according to claim 8, wherein the operating modes are combinable in any sequence.

10. A device for charging or discharging a piezoelectric element, comprising:
    a direct voltage source controlled by a control unit, the direct voltage source having a supply voltage; and
    a controller configured to modify, in a first operating mode, an actuating motion of an actuator as a function of a level of a direct voltage of the direct voltage source, the level of the direct voltage to be transmitted being determined by a variable voltage gradient, wherein an adaptation of the voltage gradient occurs within at least one of a charge operation and a discharge operation, and wherein a duration of the charge operation and a duration of the discharge operation remain constant independent of the adaptation of the voltage gradient.

11. The device according to claim 10, wherein the controller is configured to select a first operating mode and a second operating mode.

12. The device according to claim 10, wherein in the first operating mode, the actuating motion of the actuator is determined as a function of the level of the direct voltage to be transmitted via the variable voltage gradient.

13. The device according to claim 12, wherein in a second operating mode, the actuating motion of the actuator is determined as a function of a holding operation over time of the direct voltage transmittal.

14. The device according to claim 10, wherein the controller is disposed in the control unit.

15. The device according to claim 14, further comprising:
    a trigger module assigned to the control unit.

16. The device according to claim 10, further comprising:
    a charging and discharging unit assigned to the direct voltage source.

17. The device according to claim 16, wherein the piezoelectric element is assigned to the charging and discharging unit.

18. The device according to claim 10, further comprising:
    a hydraulic coupler, the piezoelectric element connected to the hydraulic coupler.

19. The device according to claim 18, further comprising:
    a control valve assigned to the hydraulic coupler.

20. The device according to claim 19, further comprising:
    an actuator assigned to the control valve.

21. The device according to claim 20, wherein the actuator is a nozzle needle.

22. The device according to claim 10, wherein the controller is a monolithically integrated circuit.

* * * * *